F. EBERHARDT.
COLLAPSIBLE MINNOW NET.
APPLICATION FILED NOV. 25, 1916.
1,348,398.
Patented Aug. 3, 1920.
2 SHEETS—SHEET 1.
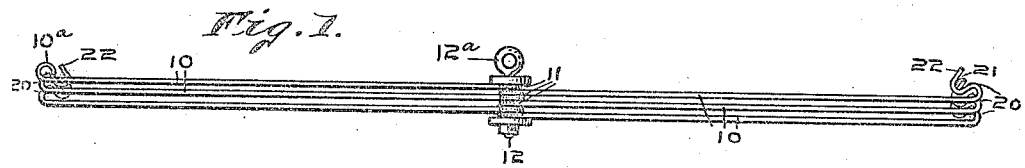
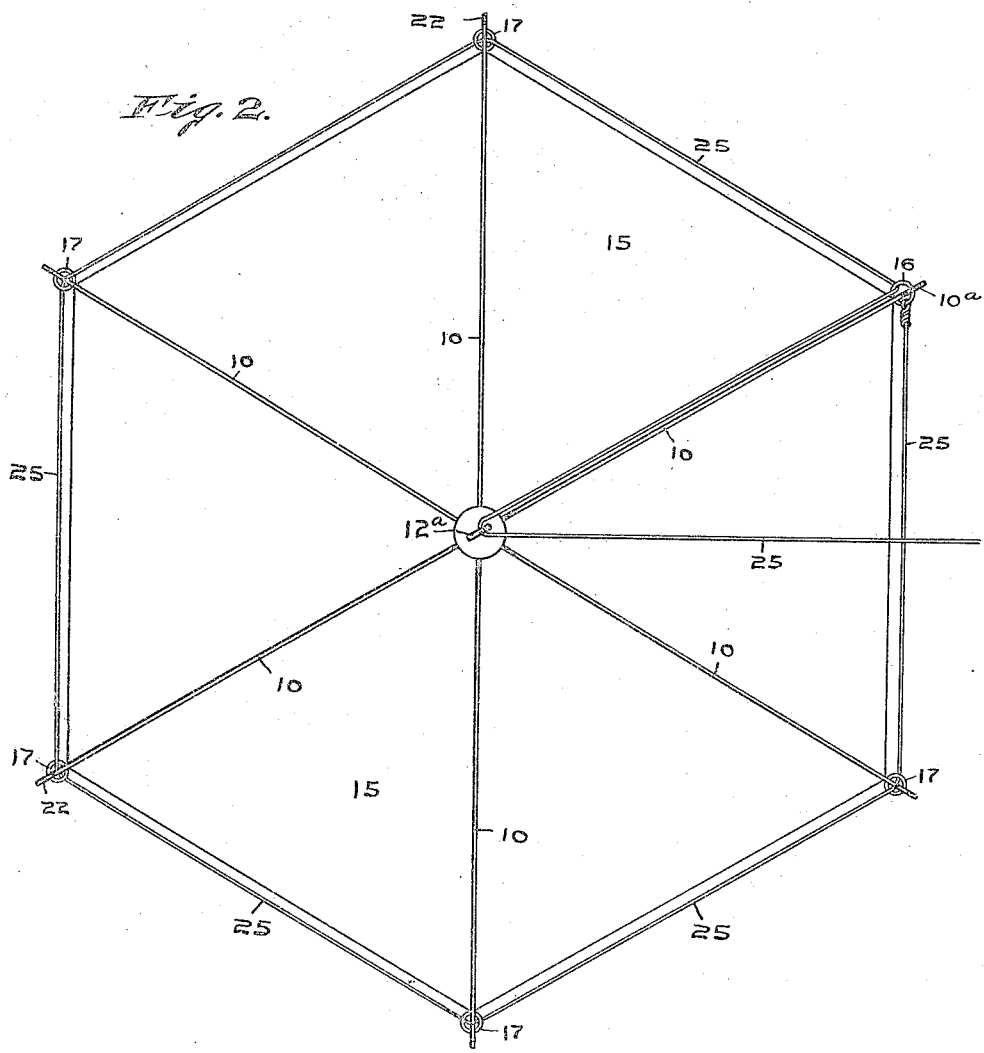
INVENTOR
Ferdinand Eberhardt,
By Minturn & Woerner
ATTORNEYS.

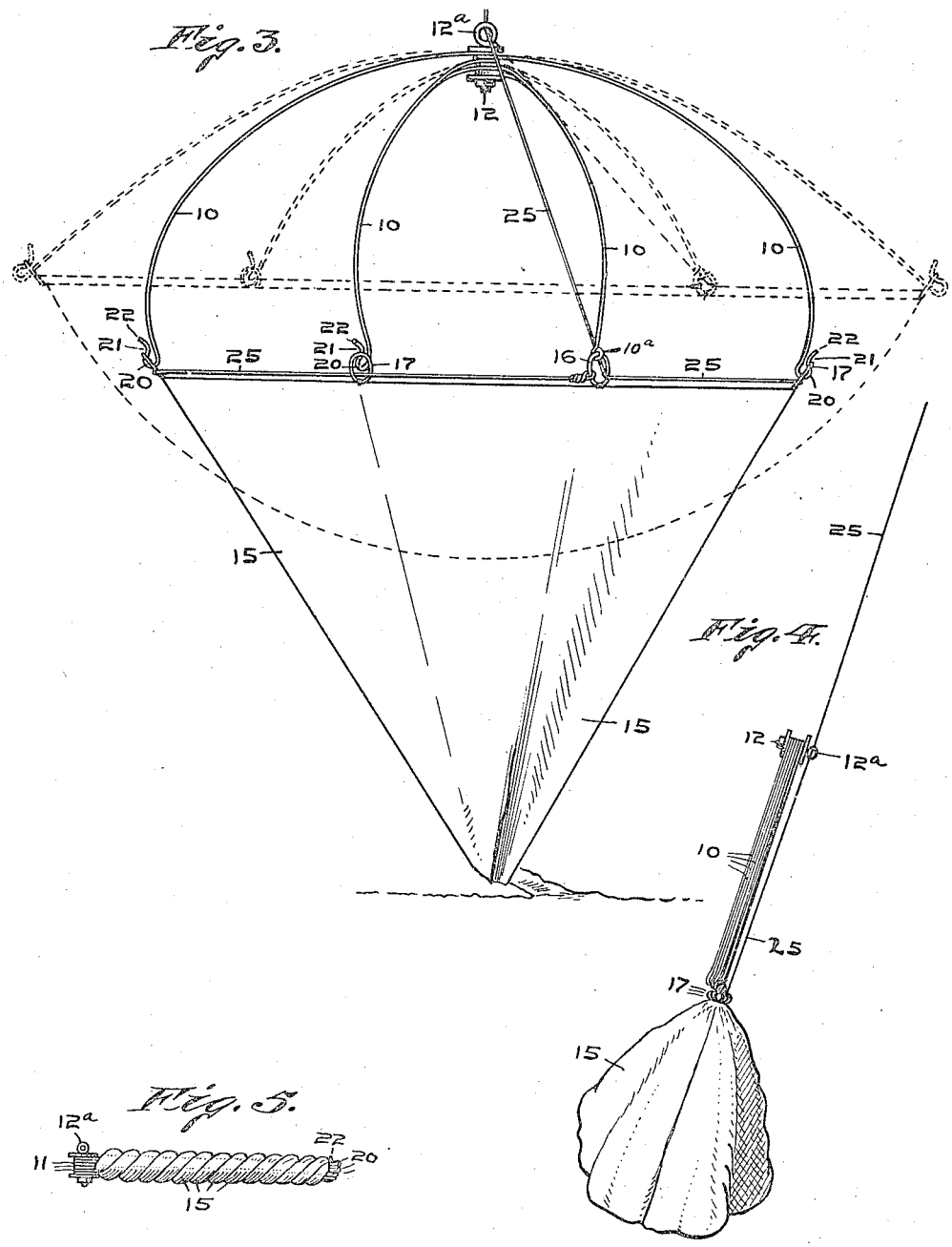

UNITED STATES PATENT OFFICE.

FERDINAND EBERHARDT, OF INDIANAPOLIS, INDIANA, ASSIGNOR TO COMPAC TENT COMPANY, OF INDIANAPOLIS, INDIANA, A CORPORATION OF INDIANA.

COLLAPSIBLE MINNOW-NET.

1,348,398.　　　　Specification of Letters Patent.　　Patented Aug. 3, 1920.

Application filed November 25, 1916. Serial No. 133,434.

*To all whom it may concern:*

Be it known that I, FERDINAND EBERHARDT, a citizen of the United States, residing at Indianapolis, in the county of Marion and State of Indiana, have invented certain new and useful Improvements in Collapsible Minnow-Nets, of which the following is a specification.

This invention relates to that class of collapsible minnow nets known as the "dip net" type; and the object of the invention consists in the provision of a net of the above character which will free itself from its supporting frame when the net becomes snagged, thus allowing the outer edge of the net to be brought together to form a sack for preventing the escape of imprisoned minnows.

A further object of the invention consists in the provision of a net of the above character which, after being collapsed, is kept under control of the operator, and further, the net and frame can be folded into a compact roll, thereby rendering same easily transportable, with other necessary fishing paraphernalia, by an individual.

I accomplish the above objects of the invention, and such others as may appear from a perusal of the specification and claims, by means of the construction illustrated in the accompanying drawings, forming a part hereof, in which—

Figure 1 is a side elevation of the frame opened, in which the net is omitted. Fig. 2 is a top or plan view of the net spread and ready for use. Fig. 3 is a side elevation wherein the dotted lines indicate the normal working positions of the parts, while the full lines indicate the contracted positions of the parts when the frame is warped. Fig. 4 is a side elevation of the position the parts assume when the frame and net are in collapsed condition. Fig. 5 is a view showing the net and frame nested.

Referring to the drawings, the collapsible dip net comprises a frame for supporting the net, the frame consisting of a number of resilient ribs 10 each of which is provided at one end with an eye 11. The eyes 11 are brought to a common center through which a bolt 12 is passed for holding the ribs in an assembled condition. Ribs 10 are susceptible of circumferential movement about bolt 12 and they may all be brought together when folded, as shown in Fig. 5, to economize space. When the device is to be placed into operation ribs 10 are radially arranged about bolt 12 at uniform spaced distances. See Fig. 2.

Net 15 comprises a suitable open mesh fabric, such as is commonly employed for the purposes in minnow net construction, and is provided at its outer edge with rings 16 and 17 which are arranged at uniform distances apart, whereby a loose connection is effected with the supporting net-frame. Net 15 is permanently attached to one of the ribs 10 by passing ring 16 through an eye $10^a$, thereby preventing complete separation between the supporting frame and net when the device is collapsed. The outer ends of ribs 10, with the exception of the one rib carrying eye $10^a$, are bent backward to form the arches 20, after which the metal is brought nearer the surface of the ribs to form the pockets or recesses 21, the free ends of the ribs being allowed to project outwardly from the recesses to form stops 22. When the frame is initially unfolded, as shown in Fig. 1, ribs 10 normally stand at right angles to bolt 12, and to enable net 15 to be attached to the ribs the latter are bent downward, or warped, until they assume the positions shown by means of the dotted lines in Fig. 3 at which points rings 17 may easily be slipped over arches 20 and into recesses 21, the resiliency of the ribs being sufficient to securely hold said rings within the recesses 21. Under normal usage, that is to say, the placing and removing of the device from the water, ribs 10 maintain sufficient rigidity and exert sufficient pressure upon the net to prevent accidental separation of the parts. However, when the operator lifts the device to make his catch of minnows and the net 15 should become fast on a snag or other obstruction, as illustrated in Fig. 3, the ribs 10 will yield under increasing pressure applied to cord 25, causing the ribs to warp to substantially the positions shown by means of the full lines in Fig. 3, at which point the ends of ribs 10 will be so dipped, or inclined to such a pitch, as to allow rings 17 to easily move out of recesses 21 and over the arches 20. Net 15 now being free from the frame, except at eye $10^a$, further pulling on cord 25 will cause the edge of the net to be gathered together to form a pouch or sack to prevent the escape of the imprisoned minnows. The edge of the net 15 when free from the supporting ribs 10 may be brought together from the fact that cord 25 after passing through an eye 12ª on bolt 12, passes first through ring 16 thence successively through each ring 17 and back to ring 16 where it is made fast, and, hence, when the free end of cord 25 is drawn away from the net the latter's edge is brought together, as shown in Fig. 4 of the drawings.

With the above description in mind, it will be observed that the supporting frame and net 15 are constantly under the control of the operator, whether in an assembled or collapsed condition.

When the device is to be packed for transporting it, the operator can fold same into a small compact bundle, as clearly shown in Fig. 5.

Having thus fully described my said invention, what I desire to secure by Letters Patent, is—

1. In a minnow net, the combination with a frame having a plurality of flexible radial ribs centered around a common axis, of a net having a permanent connection with one rib and adapted to be detachably connected to other of the ribs, said ribs constructed to be distorted to retain the net open under tension, and means for releasing the net from the frame and gathering together the edge thereof, comprising a cord guide on the frame and a manipulating cord passing through said guide and around the edge of the net.

2. A device of the above described class comprising a collapsible frame composed of a plurality of ribs, a cord guide on said frame, means for securing one end of the ribs together, a net, means carried by one of the ribs for permanently connecting the net, recesses formed on the outer ends of the remaining ribs for detachably securing the net, and an operating cord connected at one of its ends to the net and the other end extending along the edge of the net to approximately the point of connecting the cord and thence extending through the cord-guide on the frame, for gathering together the edge of the net when the latter is disengaged from the frame.

In witness whereof I have hereunto set my hand and seal at Indianapolis, Indiana, this 21st day of November, A. D. one thousand nine hundred and sixteen.

FERDINAND EBERHARDT. [L. S.]